(12) United States Patent
Logan et al.

(10) Patent No.: US 11,097,458 B2
(45) Date of Patent: Aug. 24, 2021

(54) SYSTEM FOR INJECTION MOLDING AND MOLD BASE THEREFOR

(71) Applicant: SIKA TECHNOLOGY AG, Baar (CH)

(72) Inventors: Brent Logan, Olathe, KS (US); Everett Woolum, Grain Valley, MO (US)

(73) Assignee: SIKA TECHNOLOGY AG, Baar (CH)

( * ) Notice: Subject to any disclaimer, the term of this patent is extended or adjusted under 35 U.S.C. 154(b) by 269 days.

(21) Appl. No.: 15/848,966

(22) Filed: Dec. 20, 2017

(65) Prior Publication Data

US 2018/0178426 A1     Jun. 28, 2018

(30) Foreign Application Priority Data

Dec. 23, 2016   (EP) ..................................... 16206845

(51) Int. Cl.
*B29C 45/27* (2006.01)
*B29C 45/26* (2006.01)
*B29C 45/40* (2006.01)

(52) U.S. Cl.
CPC ...... *B29C 45/2703* (2013.01); *B29C 45/2675* (2013.01); *B29C 45/2725* (2013.01); *B29C 45/4005* (2013.01); *B29C 45/2673* (2013.01); *B29C 2045/2722* (2013.01); *B29C 2945/76257* (2013.01)

(58) Field of Classification Search
CPC ............ B29C 45/2703; B29C 45/2725; B29C 45/2675; B29C 45/4005; B29C 45/2673; B29C 2045/2722; B29C 2945/76257
See application file for complete search history.

(56) References Cited

U.S. PATENT DOCUMENTS

2003/0122272 A1   7/2003   Smith et al.
2004/0076703 A1   4/2004   Saulle
2009/0324771 A1   12/2009  Kloeppel et al.

FOREIGN PATENT DOCUMENTS

EP          1 142 686 A1    10/2001
WO            02/36324 A1    5/2002
WO         2009-026667 A1    3/2009

OTHER PUBLICATIONS

Jan. 24, 2020 Office Action issued in European Patent Application No. 17 209 863.4.
May 30, 2017 Search Report issued in European Patent Application No. 16206845.6.

(Continued)

*Primary Examiner* — Robert J Grun
(74) *Attorney, Agent, or Firm* — Oliff PLC

(57) ABSTRACT

The invention relates to a mold base for a system for injection molding of plastic parts, in particular for automotive body and/or structure components, preferably for baffle and/or reinforcing structures, comprising at least one, namely first, bridge manifold with at least a first and a second bridge manifold opening for feeding material to at least a first and a second sub-manifold of at least one mold insert assembly and at least a first and a second control valve, wherein the first control valve is provided and configured for controlling the material feed through the first bridge manifold opening and the second control valve is provided and configured for controlling the material feed through the second bridge manifold opening.

23 Claims, 4 Drawing Sheets

(56) References Cited

OTHER PUBLICATIONS

Gauler; "Operation Am Offenen Herzen Komplettsysteme Und Neue Combisysteme Im Vergleich Mit Hessen Haelften;" Kunststoffe; Carl Hanser Verlag; München, DE; vol. 92 (2002); pp. 38-40.
Jun. 3, 2019 Office Action issued in European Patent Application No. 17 209 863.4.

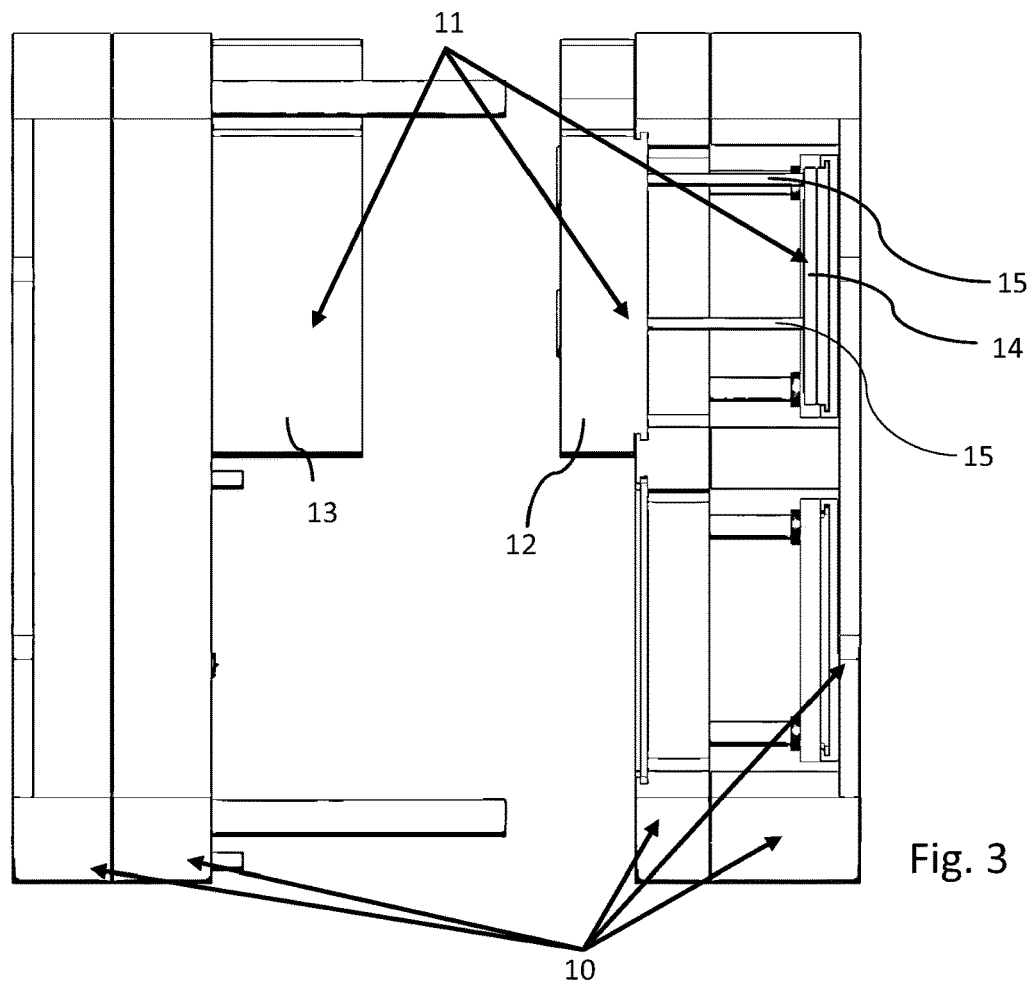
Fig. 3
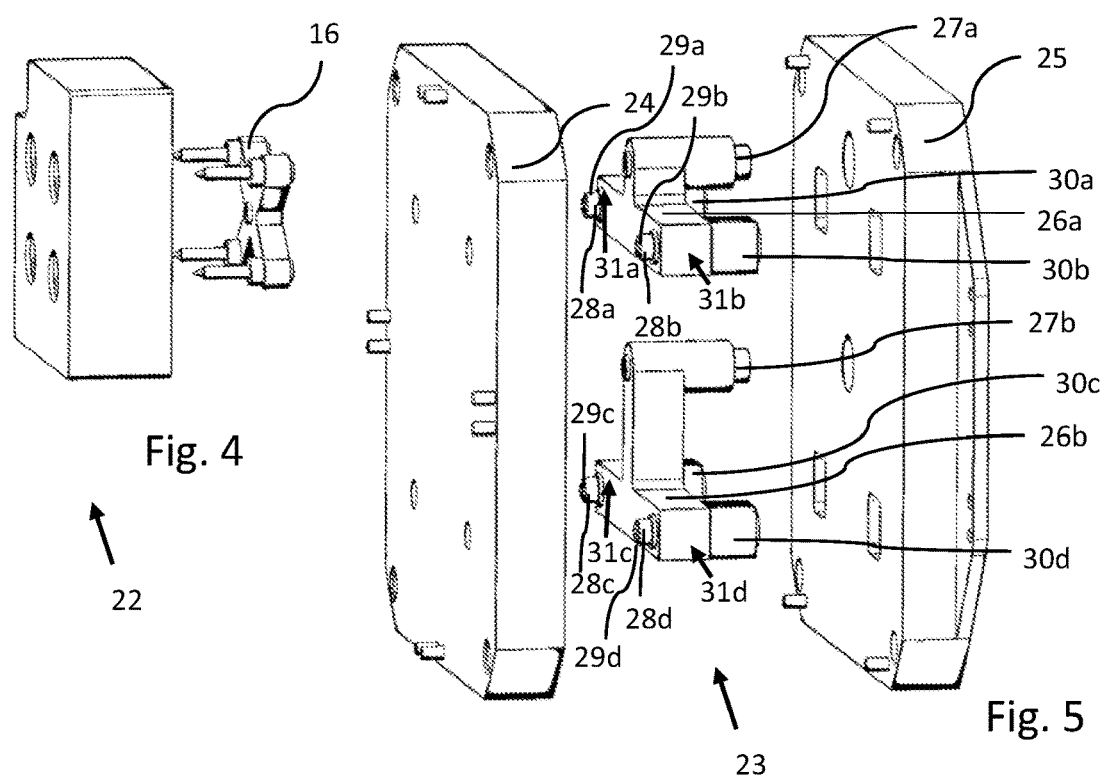
Fig. 4
Fig. 5

SYSTEM FOR INJECTION MOLDING AND MOLD BASE THEREFOR

TECHNICAL FIELD

The present invention relates to a system for injection molding of plastic parts, in particular for automotive body and/or structure components, preferably for baffle and/or reinforcing structures as well as a corresponding mold base and method.

TECHNICAL BACKGROUND

US 2003/0122272 A1 describes an injection molding apparatus comprising a mold with a stationary mold member and a moveable mold member. Molten material flows into cavities via inlets. Valve gates are used to open or close the inlets. A controller closes one valve gate when another valve gate is opened.

WO 02/036324 A1 discloses different embodiments for the injection of pressurised materials through a distribution system. In one embodiment, material flow is controlled at a point upstream of two or more nozzles leading to two or more gates. This is achieved by a controller which adjusts the position of a valve pin in order to regulate the material flow through a runner within a manifold, and likewise adjusts the position of a valve pin to regulate the material flow through another runner. Via both runners, a cavity portion is filled. A controller varies a position of the valve pins over time to match target pressure profiles respectively corresponding thereto.

US 2009/0324771 A1 discloses a hot runner system of modular construction for injection molding. US 2004/0076703 A1 discloses a modular system for molds of injection molding machines.

In order to reduce tooling costs and mold change time, several approaches for quick change mold systems have been developed. Usually such systems focus on single shot type molds. Moreover, it is generally known to control, in particular balance, plastic flow and pressure from gate to gate (whereby gate means the portion from which the plastic flow emerges into the corresponding cavity, e.g. from a sprout). Existing two-shot mold designs and constructions involve comparatively high tooling costs. Moreover, known solutions are limited regarding the flexibility in use. Once tooled, all parts within a larger family mold must run with the same material.

SUMMARY

It is an object of the present invention to provide a flexible and cost-saving, in particular with respect to tooling costs, system for injection molding of plastic parts, in particular for automotive body and/or structure components, preferably for baffle and/or reinforcing structures. Moreover, it is an object of the present invention to provide a corresponding mold base for such system and a corresponding method of injection molding of plastic parts, in particular for automotive body and/or structure components, preferable for baffle and/or reinforcing structures.

According to a first aspect of the present invention, a mold base for a system for injection molding of plastic parts, in particular for automotive body and/or structure components, preferable for baffle and/or reinforcing structures, is proposed, wherein the mold base comprises at least one (first) bridge manifold (main manifold) with at least a first and a second bridge manifold opening for feeding material to at least a first and a second sub-manifold of at least one mold insert assembly and at least a first and a second control valve, wherein the first control valve is provided and configured for controlling the material feed through the first bridge manifold opening and the second control valve is provided and configured for controlling the material feed through the second bridge manifold opening.

According to a further aspect of the invention, a system for injection molding of plastic parts, in particular for automotive body and/or structure components, preferable for baffle and/or reinforcing structures, comprises a mold base as described above and at least one mold insert assembly having at least one sub-manifold being connectable or connected to at least one of the first or second bridge manifold openings.

A core idea of the invention is to provide a modular solution that allows for rapid changing of a mold insert assembly. An important feature of the invention is the first and second control valves which allow to control (in particular balance) for example flow and/or pressure from one sub-manifold to another sub-manifold. Existing technology provides (only) a control from gate to gate (i.e. from cavity to cavity). Thereby, in particular the tooling costs can be reduced, in particular by reducing the number of components the mold manufacturer is required to build. Moreover, the material to be molded can be changed (with high flexibility) while maintaining low part costs associated with family molds. According to the invention, a high flexibility and cost reduction compared to current technology can be achieved. Tooling costs can be reduced. Costs for implementing design or material changes can be reduced. The process control can be improved. The part quality can be improved (i.e. flash and short shot defects can be reduced). The flexibility to change the pairing of parts for different programs or customers within the same tool is increased. The mold insert assembly may require only ejector plates, ejectors, a core block, a cavity block and a sub-manifold. In particular, the mold base may comprise servo (driven) valves at each connection of the bridge manifold in order to control plastic flow and pressure. A valve position may be controlled via time, pressure or both. Different mold insert assemblies may be inserted into a universal mold base. Such universal mold base may contain (on the A-Side) for example hot runner bridges and/or servo-driven valve gates (within transfer connections where the bridge manifold meets the sub-manifolds).

A control of the material feed means in particular that (for a given condition), the respective control valve may be controlled so that at least two different flow rates above zero, preferably at least five different flow rates above zero, further preferably at least ten different flow rates above zero and/or at least two different fluid pressures, preferably at least three different fluid pressures, further preferably at least five different fluid pressures can be controlled. Pressure and/or flow rate may be continuously controllable or in discrete intervals, preferably in at least two, further preferably at least five, further preferably at least ten steps.

The mold base may comprise at least one further (second) bridge manifold with at least a third and a fourth bridge manifold opening for feeding material to at least a third and a fourth sub-manifold of at least one mold insert assembly and at least a third and a forth control valve, wherein the third control valve is provided and configured for controlling the material feed through the third bridge manifold opening and the fourth control valve is provided and configured for controlling the material feed through the fourth bridge manifold opening. Thereby, a simple 2-shot family type tooling can be provided which enhances the flexibility for the injection molded process.

Preferably, the first and/or second bridge manifold is formed by a hot runner bridge. In general, the above (and below) described mold base and the above (and below) described system may be a hot runner mold base or a hot runner system, respectively. In particular, at least one heating device is provided for heating the hot runner bridge so that the material in the hot runner bridge may be kept in a molten state (during the injection molding process). Thereby, material can be saved.

The first and/or second bridge manifold may be of a one-piece structure (not necessarily, though, monolithic). Preferably, the first and second bridge manifold are separated from each other (in particular not being formed by the same, coherent structure). The first and/or second sub-manifold may be structurally separated with respect to the first bridge manifold, in particular meaning that they are connected or connectable (as separate parts) to the corresponding first and/or second opening(s) of the first bridge manifold. In addition or alternatively, a third and fourth sub-manifold may be structurally separated with respect to the second bridge manifold, in particular meaning that they are connected or connectable (as separate parts) to the corresponding third and/or fourth opening(s) of the second bridge manifold.

First and/or second and/or third and/or fourth sub-manifolds may be of a one-piece structure (not necessarily, though, monolithic). First and/or second bridge manifolds may comprise at least two arms (e.g. exactly two arms) which lead to the corresponding openings to the corresponding sub-manifolds. Also the first and/or second and/or third and/or fourth sub-manifolds may comprise at least two, preferably at least three, further preferably at least four (e.g. exactly four) arms leading to their nozzles or sprouts, respectively.

Preferably, at least one (further preferably several of or all of) the first and second control valves of the first bridge manifold and the third and fourth control valves of the second bridge manifold may be an electrically driven valve and/or a continuously adjustable valve, in particular a proportional valve or a servo valve, or a discretely (e.g. with at least two different or at least five different values above zero) adjustable valve. In particular, servo (driven) valves (or valve gates respectively) are provided within the (transfer) connection where the bridge manifold meets the corresponding sub-manifold. Thereby, a reliable and precise control of the material flow into the sub-manifolds can be achieved. In general, a control of the respective control valve may be an open-loop or a, preferably, closed-loop control.

At least one of the (preferably several of, further preferably all of) first and second control valves of the first bridge manifold and, optionally, the third and fourth control valves of the second bridge manifold may be controllable or controlled via time and/or pressure, in particular a pressure within the bridge manifold and/or a pressure in at least one of the sub-manifolds. Thereby, the control (in particular balancing) of the material flow can be improved.

At least one pressure determining means, in particular pressure sensor, may be provided, for determining (sensing) a pressure within the bridge manifold and/or a pressure in at least one of the sub-manifolds. A pressure transducer may be provided (within the bridge manifold and/or one of the sub-manifolds) that may provide real time pressure readings to a controller system.

In general, a controller (controller system) may be provided which may open and close the control valves (preferably in real time). The controller may control the material flow dependent on pressure readings and/or any input from an operator or other device. Consequently, improved cavity pressure conditions can be obtained. This may result in increased part quality, in particular by reducing the possibility for flashes or shots. A control function as explained above may also provide a certain level of protection for the mold itself. For example, in the event of a double shot, a pressure spike outside of predetermined limits may be sensed so that a corresponding valve (gate) may be immediately closed, thereby reducing the possibility of mold damage that may be the consequence of excessive cavity pressure.

The mold base may form a frame for receiving at least one (preferably at least two or more) mold insert assembly (assemblies). Thereby, mounting and changing of one or more mold inserts is possible. Tooling costs are reduced.

The mold base may comprise an A-Side assembly, preferably comprising the first and (optional) second bridge manifold and a clamp member, in particular clamp plate and/or a cavity mounting member, in particular cavity mounting plate. Moreover, the mold base may comprise a B-Side assembly, preferably comprising a clamp member, in particular a clamp plate and/or a B-Side mounting member, in particular B-Side mounting plate, and/or an ejector supporting member, in particular ejector frame. Through such assemblies, mounting and changing one or more of the mold insert assemblies is realisable and fast. The term A-Side refers to the side of the mold base from which the molten plastic is injected into the mold. The B-Side refers to the other side of the mold base. Preferably, from the B-Side the molded plastic part is ejected.

At least one of (preferably several of, in particular all of) the mold insert assemblies may comprise at least one ejector and/or at least one ejector plate and/or at least one core member, in particular core block, preferably with a plurality of core structures, and/or at least one cavity member, in particular cavity block, preferably with a plurality of cavities.

The core member (in particular core block) may comprise at least one (in particular two or more) removable insert(s) having at least one (in particular two or more) core structure(s). The cavity member (in particular cavity block) may comprise at least one (preferably two or more) removable insert(s) having at least one (preferably two or more) cavity (cavities). This further improves the flexibility of the injection molding system.

The mold may define (in a closed state) a plurality of at least two, preferably at least four, further preferably at least 10 (separate) cavities to be filled.

Preferably, each (injection) nozzle of at least one sub-manifold (in particular all sub-manifolds) are configured to fill a (separate particular) cavity. Alternatively, two or more nozzles of the same sub-manifold may fill the same cavity.

According to a further aspect of the invention, a method of injection molding of plastic parts, in particular for automotive body and/or structure components, preferably for baffle and/or reinforcing structures, is provided, comprising the steps of providing the system above and of controlling, in particular balancing, the flow of material through the first and second bridge manifold openings via the first and second control valve.

According to another aspect of the invention, a use of the above mold base and/or the above system for injection molding of plastic parts, in particular for automotive body and/or structure components, preferably for baffle and/or reinforcing structures, is proposed.

The plastic material may be expandable, in particular foamable, and/or may be or may comprise polymeric material. The expansion (foaming) may be triggered by heat application. The base mold and/or the system is preferably used for molding of expandable acoustic baffles in particular for the automotive industry.

BRIEF DESCRIPTION OF THE DRAWINGS

In the following, preferred embodiments of the present invention are described with reference to the drawings. These show:

FIG. 3 A partially exploded side view of the embodiment of FIG. 1;

FIG. 4 A partially exploded perspective view of an A-Side assembly of a mold insert assembly according to the invention;

FIG. 5 A partially exploded perspective view of an A-Side assembly of a mold base according to the invention;

DETAILED DESCRIPTION OF THE EMBODIMENT

Figure 1:
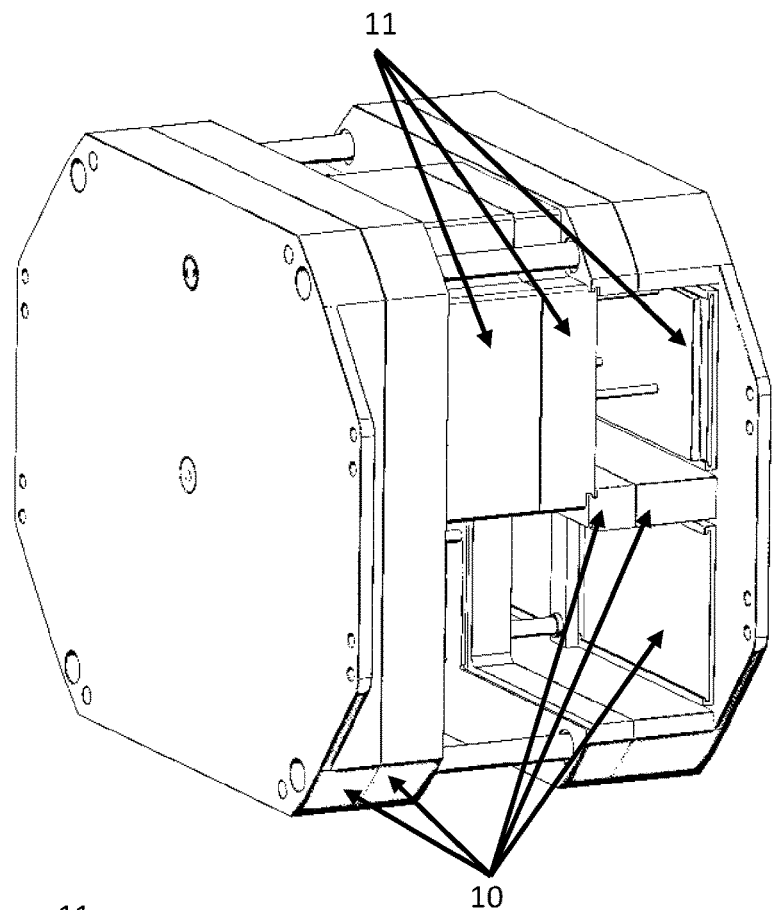
FIG. 1 A perspective view of a first embodiment of a system for injection molding according to the invention.
Figure 2:
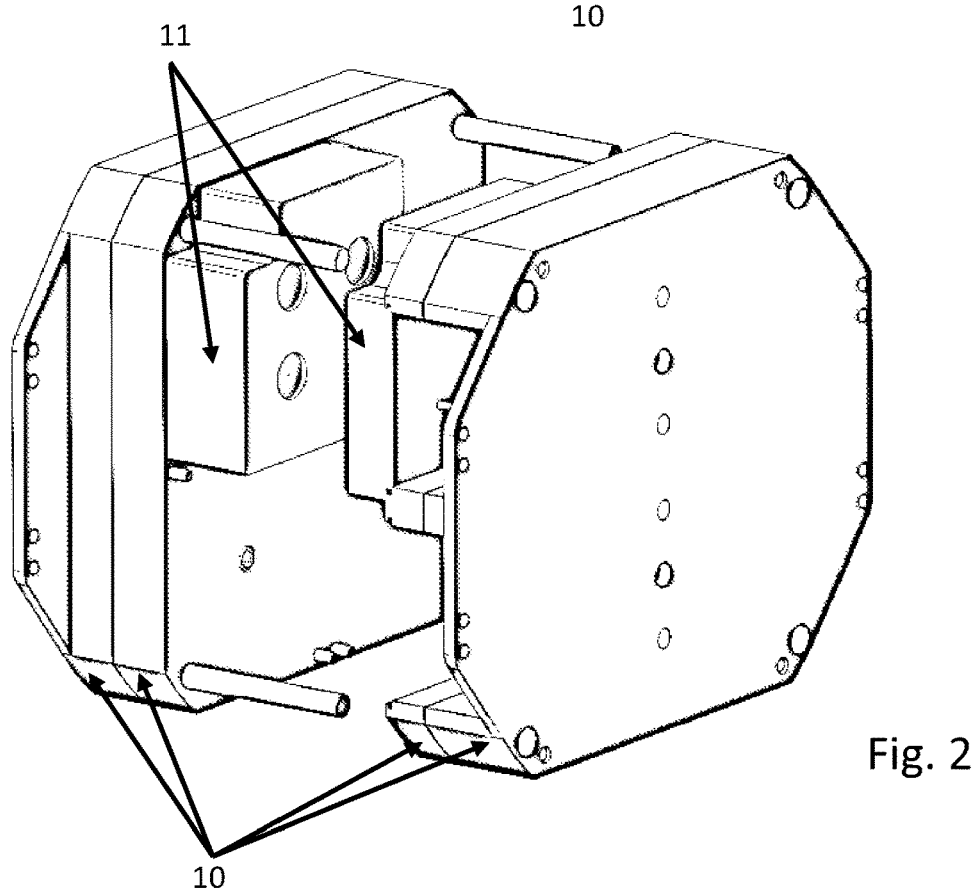
FIG. 2 A partially exploded perspective view of the embodiment of FIG. 1.
Figure 7:
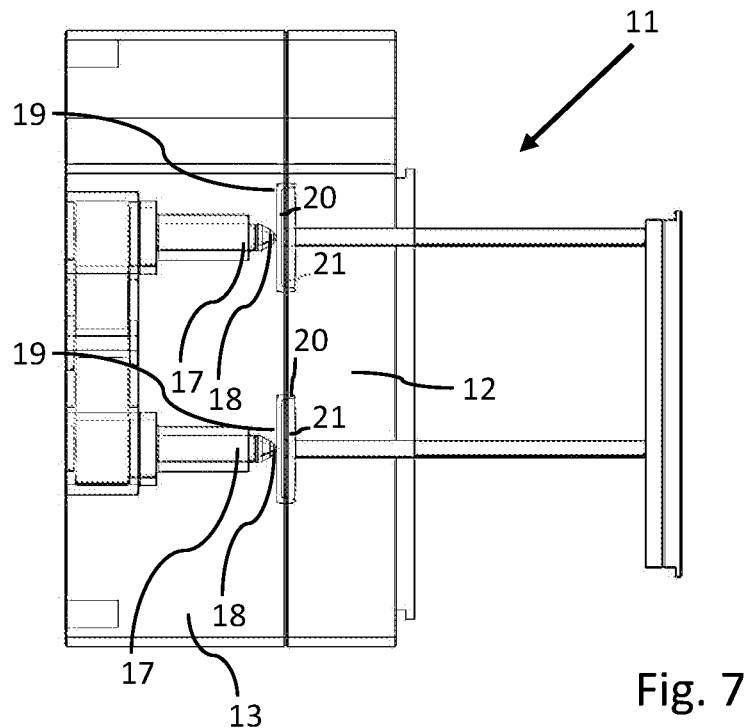
FIG. 7 A side view of a mold insert assembly according to the invention with all surfaces being transparent.

FIGS. 1 to 3 illustrate an embodiment of a system for injection molding. The system comprises a mold base 10 and at least one (in FIGS. 1 to 3, only one is shown) mold insert assembly 11. The mold insert assembly 11 comprises a core block 12 (see FIG. 3), a cavity block 13, an ejector plate 14, ejectors 15 and (see FIG. 4, showing an A side assembly 22 of the mold insert assembly) a sub-manifold 16. FIG. 7 shows the mold insert assembly 11 with all surfaces transparent in a side view. The material to be fed is transported to (in this case four) sprouts 17 each having a nozzle 18 at their distal ends. From the nozzle, material is fed into a corresponding cavity 19 being formed by a cavity 20 in the cavity block and a core structure 21 in the core block. The injection molded parts in the cavities 19 can be ejected by the ejectors 15.

FIG. 5 shows an A-Side assembly 23 of the mold base 11. The A-Side assembly 23 comprises a cavity mounting plate 24, a (stationary) clamp plate 25 and (in the present case two) bridge manifolds 26a and 26b. The bridge manifolds 26a, 26b comprise a material feed interface 27a, 27b, transfer bushings 28a, 28b, 28c and 28d, defining bridge manifold openings 29a, 29b, 29c and 29d and (servo-driven) valve gates 30a, 30b, 30c and 30d through which (servo) valves within the bridge manifold can be controlled in order to control pressure and/or flow of the material in the direction of openings 29a, 29b, 29c and 29d. The location of the (servo) valves is indicated by 31a, 31b, 31c and 31d.

Figure 6:
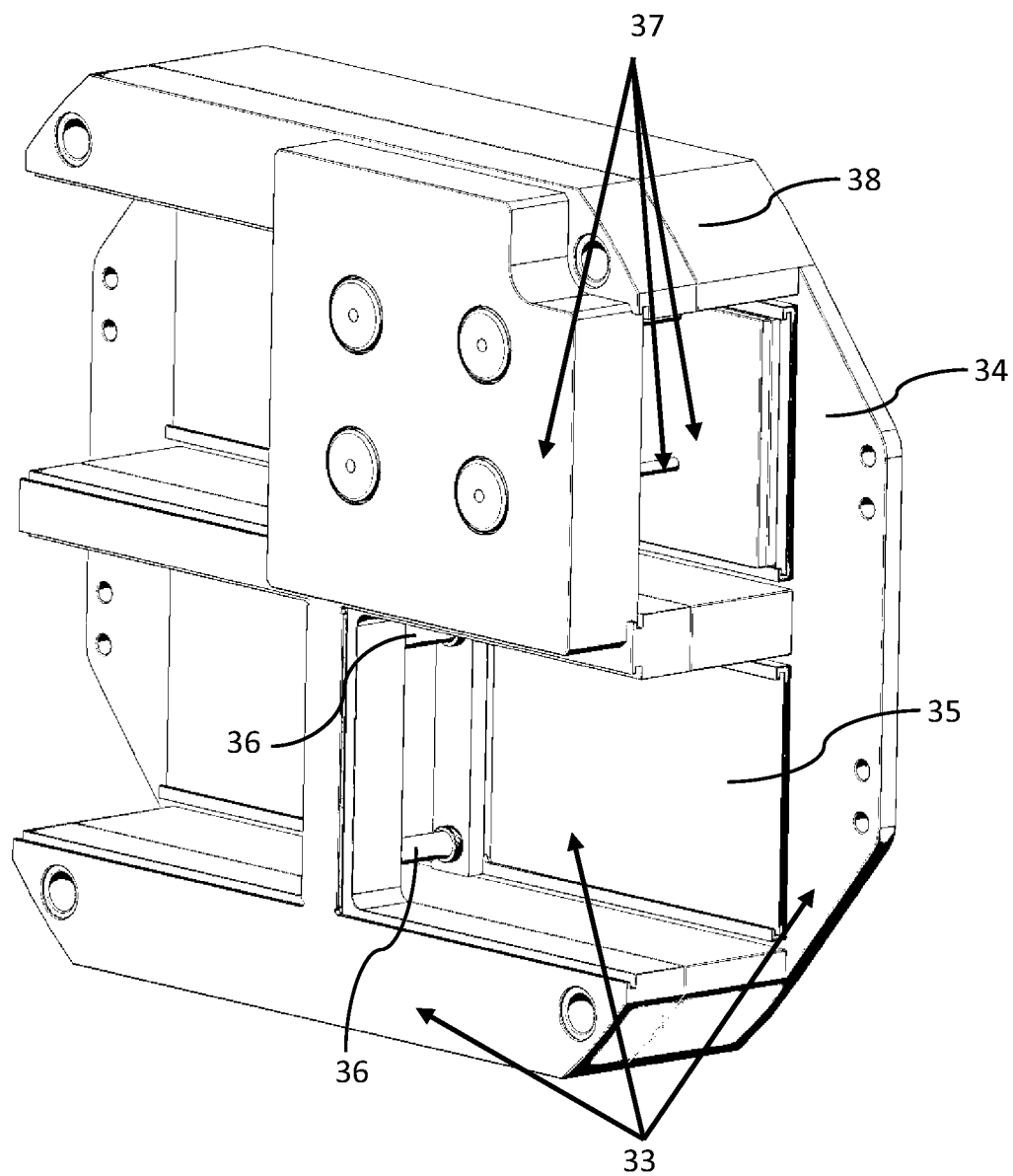
FIG. 6 A perspective view of a B-Side assembly of the mold base together with a B-Side assembly of the mold insert assembly according to the invention.

FIG. 6 shows a B-Side assembly 33 of the mold base 10 having a B-Side clamp plate 34, a B-side mounting structure 38, an ejector frame 35 and ejector guides 36. Moreover, FIG. 6 shows a B-Side assembly 37 of the mold insert assembly 11.

Figure 8:
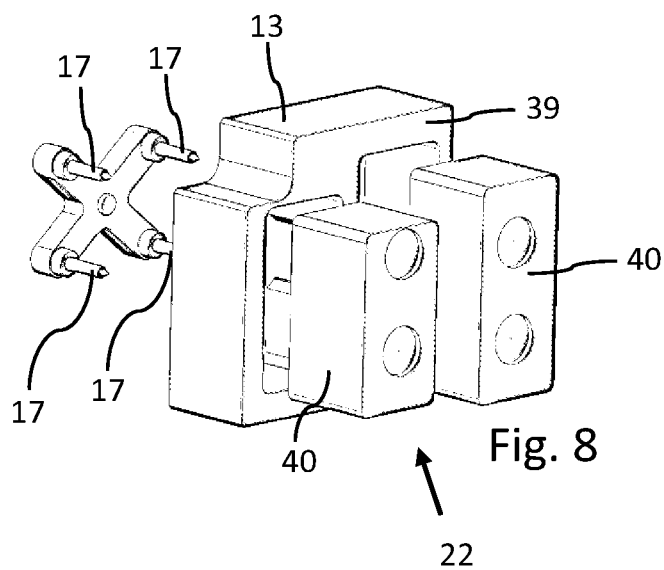
FIG. 8 A partially exploded perspective view of a further embodiment of an A-Side assembly of a mold insert assembly.
Figure 9:
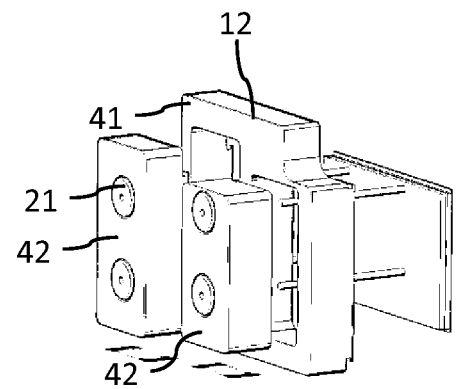
FIG. 9 A partially exploded perspective view of a B-Side assembly of the mold insert assembly according to the invention.
Figure 10:
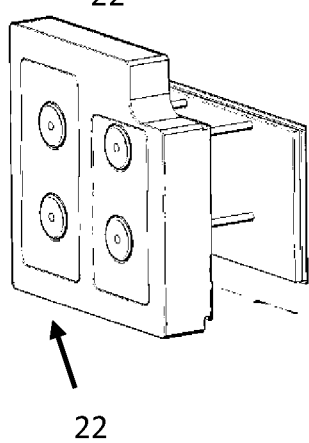
FIG. 10 A perspective view of the B-Side assembly according to FIG. 9.

FIGS. 8 to 10 show a further embodiment of an A-Side assembly 22 of mold insert assembly 11. In this case, the cavity block 13 comprises a cavity block shoe 39 in which (in the present case two) cavity block inserts 40 can be inserted and removed (and be replaced by different cavity block inserts 40). Similarly, according to FIGS. 9 and 10 showing the B-Side assembly 37 of mold insert assembly 11, the core block 12 comprises a core block shoe 41 and (in the present case two) core block inserts 42 which can be inserted and be removed (and be replaced with different core block inserts 42) in/from the core block shoe 41. The cavity block inserts 40 comprise the mold cavities. The core block inserts 42 comprise the mold cores.

REFERENCE SIGNS

10 Mold base
11 Mold insert assembly
12 Core block
13 Cavity block
14 Ejector plate
15 Ejector
16 Sub-manifold
17 Sprout
18 Nozzle
19 Cavity
20 Cavity
21 Core structure
22 A side assembly of the mold insert assembly
23 A-Side assembly
24 Cavity mounting plate
25 Clamp plate
26a First bridge manifold
27a Second bridge manifold
27a Material feed interface
27b Material feed interface
28a Bushing
28b Bushing
28c Bushing
28d Bushing
29a Bridge manifold opening
29b Bridge manifold opening
29c Bridge manifold opening
29d Bridge manifold opening
30a Valve gate
30b Valve gate
30c Valve gate
30d Valve gate
31a Valve
31b Valve
31c Valve
31d Valve
33 B-Side assembly
34 Clamp plate
35 Ejector frame
36 Ejector guide
37 B-Side assembly
38 B-side mounting structure
39 Cavity block shoe
40 Cavity block insert 41 Core block shoe
42 Core block insert

The invention claimed is:

1. A modular system for injection molding of plastic parts, the system comprising:
   at least one mold insert assembly comprising at least a first and a second sub-manifold; and
   a mold base comprising (i) a first bridge manifold with at least a first and a second bridge manifold opening for feeding material to the first and the second sub-manifold of the at least one mold insert assembly, and (ii) at least a first and a second control valve, the first control valve being provided and configured for controlling the material feed through the first bridge manifold opening and the second control valve being provided and configured for controlling the material feed through the second bridge manifold opening,
   wherein the first and the second sub-manifold of the at least one mold insert assembly are configured to be connected to the first or second bridge manifold openings,
   the mold insert assembly is configured to be detached from the mold base as a module in the modular system, and
   the mold insert assembly includes at least one ejector and at least one ejector plate.

2. The modular system of claim 1, wherein the mold base further comprises:
   a second bridge manifold with at least a third and a fourth bridge manifold opening for feeding material to at least a third and a fourth sub-manifold of the at least one mold insert assembly, and
   at least a third and a fourth control valve, the third control valve being provided and configured for controlling the material feed through the first bridge manifold opening and the fourth control valve being provided and configured for controlling the material feed through the fourth bridge manifold opening.

3. The modular system of claim 2, wherein at least one of the first and second control valves of the first bridge manifold and, optionally, the third and fourth control valves of the second bridge manifold is an electrically driven valve.

4. The modular system of claim 2, wherein at least one of the first and second control valves of the first bridge manifold and, optionally, the third and fourth control valves of the second bridge manifold are configured to be controlled via time.

5. The modular system of claim 2, wherein the second bridge manifold is formed by a hot runner bridge.

6. The modular system of claim 2, wherein at least one of the first and second control valves of the first bridge manifold and, optionally, the third and fourth control valves of the second bridge manifold is a continuously adjustable valve.

7. The modular system of claim 2, wherein at least one of the first and second control valves of the first bridge manifold and, optionally, the third and fourth control valves of the second bridge manifold are configured to be controlled via pressure.

8. The modular system of claim 7, wherein the pressure is a pressure within the bridge manifold.

9. The modular system of claim 7, wherein the pressure is a pressure in at least one of the sub-manifolds.

10. The modular system of claim 1, wherein the first bridge manifold is formed by a hot runner bridge.

11. The modular system of claim 1, further comprising at least one pressure determining device for determining a pressure within the bridge manifold.

12. The modular system of claim 1, wherein the mold base forms a frame for receiving the at least one mold insert assembly.

13. The modular system of claim 1, wherein the mold base comprises an A side assembly comprising the first and optional second bridge manifold.

14. The modular system of claim 1, wherein the mold base comprises a B side assembly comprising a clamp member.

15. The modular system of claim 1, wherein the mold insert assembly comprises at least one core member.

16. The modular system of claim 15, wherein the core member comprises at least one removable insert having at least one core structure.

17. The modular system of claim 1, further comprising at least one pressure determining device for determining a pressure in at least one of the sub-manifolds.

18. The modular system of claim 1, wherein the mold base comprises an A side assembly comprising a clamp member.

19. The modular system of claim 1, wherein the mold base comprises an A side assembly comprising a cavity mounting structure.

20. The modular system of claim 1, wherein the mold base comprises a B side mounting structure.

21. The modular system of claim 1, wherein the mold base comprises an ejector supporting member.

22. The modular system of claim 1, wherein the mold insert assembly comprises at least one cavity member.

23. The modular system of claim 22, wherein the cavity member comprises at least one removable insert having at least one cavity.

* * * * *